(12) United States Patent
Goto et al.

(10) Patent No.: US 8,548,657 B2
(45) Date of Patent: Oct. 1, 2013

(54) CONTROL APPARATUS FOR HYBRID VEHICLE

(75) Inventors: Keisuke Goto, Shioya-gun (JP);
Toshihiko Fukuda, Utsunomiya (JP);
Yohei Okagawa, Utsunomiya (JP);
Hiroshi Ito, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 450 days.

(21) Appl. No.: 12/667,864

(22) PCT Filed: Jul. 10, 2008

(86) PCT No.: PCT/JP2008/062483
§ 371 (c)(1),
(2), (4) Date: Jan. 5, 2010

(87) PCT Pub. No.: WO2009/008477
PCT Pub. Date: Jan. 15, 2009

(65) Prior Publication Data
US 2010/0332062 A1    Dec. 30, 2010

(30) Foreign Application Priority Data
Jul. 12, 2007    (JP) .................................. 2007-183462

(51) Int. Cl.
*B60K 6/485*    (2007.10)
(52) U.S. Cl.
USPC ......................................... 701/22; 180/65.28
(58) Field of Classification Search
USPC ............ 701/22, 54, 101, 70, 99; 180/65.265, 180/65.21, 65.23, 65.25–65.29, 65.245, 65.285, 180/165; 320/132, 135; 903/903, 947, 930, 903/946; 475/5; 290/40 A, 40 B, 40 C, 40 R; 477/3, 16, 20, 101, 109, 47
See application file for complete search history.

(56) References Cited

U.S. PATENT DOCUMENTS

| | | | |
|---|---|---|---|
| 5,722,911 A | | 3/1998 | Ibaraki et al. |
| 5,806,617 A | * | 9/1998 | Yamaguchi .............. 180/65.235 |
| 5,903,061 A | * | 5/1999 | Tsuzuki et al. ............. 290/40 C |
| 5,973,460 A | | 10/1999 | Taga et al. |
| 6,116,368 A | | 9/2000 | Lyons et al. |
| 6,131,680 A | | 10/2000 | Nii et al. |

(Continued)

FOREIGN PATENT DOCUMENTS

| | | |
|---|---|---|
| EP | 1 086 864 A2 | 9/2000 |
| EP | 1 086 846 A2 | 3/2001 |

(Continued)

OTHER PUBLICATIONS

Russian Language Notice of Allowance dated Sep. 5, 2011.

(Continued)

*Primary Examiner* — Marthe Marc-Coleman
(74) *Attorney, Agent, or Firm* — Arent Fox LLP

(57) ABSTRACT

A control apparatus for a hybrid vehicle includes an internal combustion engine and a generator motor, a capacitor, and a driving force assisting unit. Further, the control device includes a switching unit that selects an appropriate traveling range from a plurality of traveling ranges including at least a normal traveling range and a charging priority range for preferentially charging the capacitor and switches the range, and a threshold value increasing unit that increases, when the charging priority range is selected by the switching unit, the predetermined determination threshold value as compared to when the normal traveling range is selected by the switching unit.

6 Claims, 6 Drawing Sheets

(56) References Cited

U.S. PATENT DOCUMENTS

| | | | |
|---|---|---|---|
| 6,166,517 A | 12/2000 | Wakashiro et al. | |
| 6,205,379 B1 | 3/2001 | Morisawa et al. | |
| 6,216,465 B1 | 4/2001 | Wakashiro et al. | |
| 6,314,346 B1 | 11/2001 | Kitajima et al. | |
| 6,316,842 B1 | 11/2001 | Kuroda et al. | |
| 6,333,612 B1 * | 12/2001 | Suzuki et al. | 180/165 |
| 6,570,266 B1 * | 5/2003 | Wakashiro et al. | 290/40 C |
| 6,702,052 B1 | 3/2004 | Wakashiro et al. | |
| 6,839,619 B2 | 1/2005 | Bellinger | |
| 7,996,139 B2 | 8/2011 | Okuda et al. | |
| 2002/0108794 A1 | 8/2002 | Wakashiro et al. | |
| 2002/0123836 A1 | 9/2002 | Komiyama et al. | |
| 2007/0112496 A1 | 5/2007 | Ji | |
| 2007/0275818 A1 * | 11/2007 | Kouno | 477/3 |

FOREIGN PATENT DOCUMENTS

| | | |
|---|---|---|
| JP | 2000-102110 A | 4/2000 |
| JP | 2000-184507 A | 6/2000 |
| JP | 2001-88586 A | 4/2001 |
| JP | 2001-95104 A | 4/2001 |
| JP | 2001-128309 A | 5/2001 |
| JP | 2003-130199 A | 5/2003 |
| JP | 2004-282999 A | 10/2004 |
| JP | 2005-155891 A | 6/2005 |
| JP | 2005-269793 A | 9/2005 |
| JP | 2005-341644 A | 12/2005 |
| JP | 2006-197756 A | 7/2006 |
| RU | 2 223 183 C2 | 2/2004 |
| WO | WO 2004/026606 A1 | 4/2004 |

OTHER PUBLICATIONS

Office Action issued in U.S. Appl. No. 13/491,471 dated Nov. 8, 2012.

* cited by examiner

ASSIST PERFORMING DETERMINATION THRESHOLD VALUE

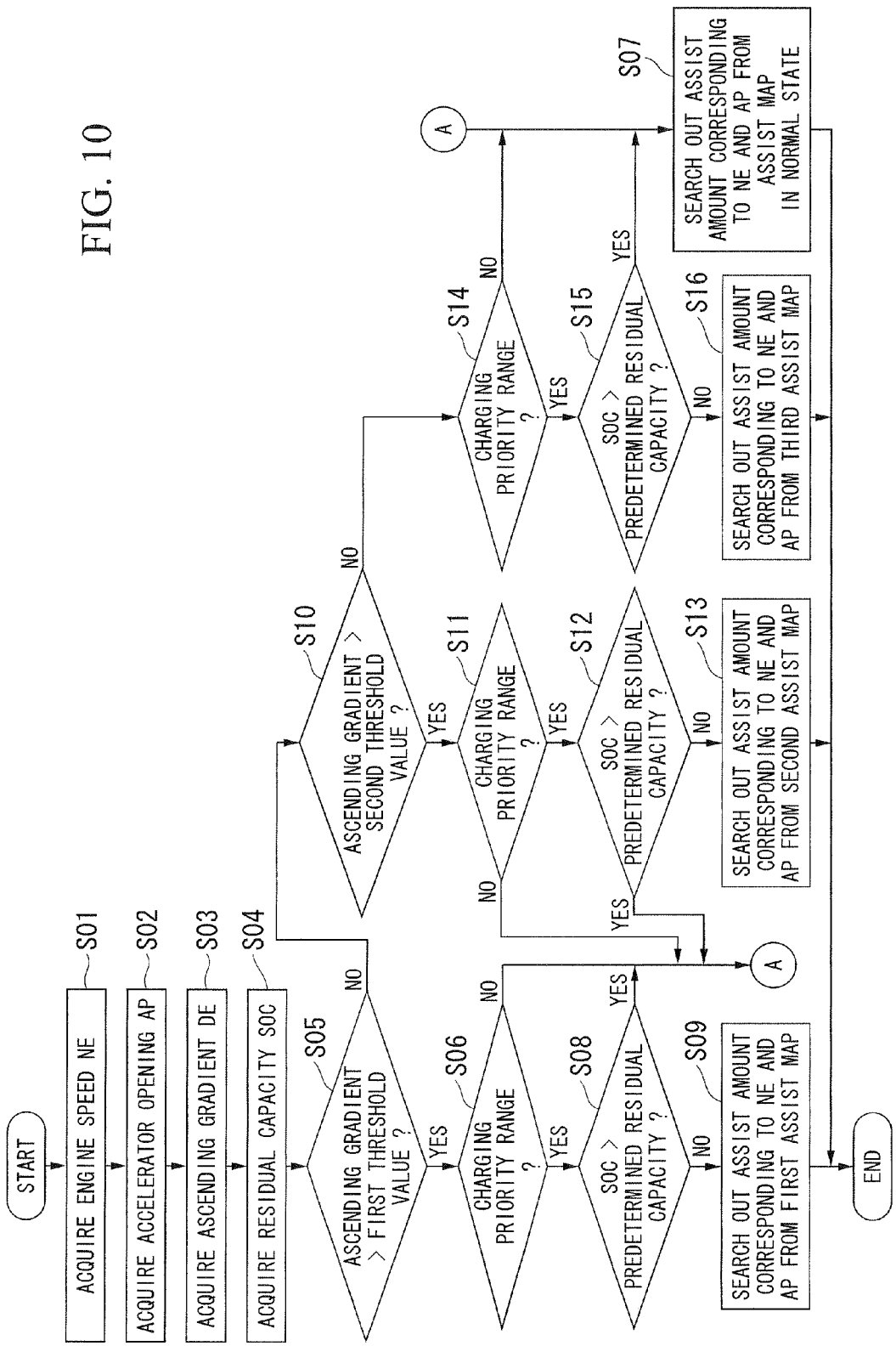

CONTROL APPARATUS FOR HYBRID VEHICLE

TECHNICAL FIELD

The present invention relates to a control apparatus for a hybrid vehicle.

Priority is claimed on Japanese Patent Application No. 2007-183462, the content of which is incorporated herein by reference.

BACKGROUND ART

In the past, there has been known a hybrid vehicle that includes, for example, an internal combustion engine and a motor as driving sources and transmits a driving force from at least one of the internal combustion engine and the motor to driving wheels, thereby traveling. While traveling on an ascending road, the hybrid vehicle relatively reduces regenerative torque of the electric motor. Thereby, the hybrid vehicle prevents excessive deceleration feeling from occurring, and ensures desired drivability (for example, refer to Patent Document 1).

For example, when the hybrid vehicle moves from a flat road to an ascending road, if the operation amount of the accelerator operated by a driver becomes larger than a predetermined threshold value, the powering operation of the electric motor is performed, so that the driving force of the internal combustion engine is assisted by the driving force of the electric motor.

[Patent Document 1] Japanese Unexamined Patent Application, First Publication No. 2005-269793

DISCLOSURE OF THE INVENTION

Problems to be Solved by the Invention

Meanwhile, when a vehicle travels on the ascending road, merely, the control apparatus for a hybrid vehicle according to the related art relatively decreases the regenerative torque of the electric motor or increases the assist amount of the electric motor for assisting the internal combustion engine. Accordingly, for example, if the vehicle travels on the ascending road for a long time, or if the ascending gradient of the ascending road corresponds to a relatively high gradient, there is a concern that the electrical energy required for driving the electric motor is insufficiently stored in the capacitor. For this reason, there is a problem in that it is not possible to ensure desired ascending performance.

The present invention has been made in consideration of the above circumstances, and has an object of providing a control apparatus for a hybrid vehicle that can ensure desired ascending performance.

Means for Solving the Problems

In order to achieve the object, the present invention employs the followings.

That is, (1) A control apparatus for a hybrid vehicle according to an embodiment of the invention includes an internal combustion engine and a generator motor that are used as power sources of a vehicle, a capacitor that supplies and receives electrical energy to and from the generator motor, and a driving force assisting unit that assists a driving force of the internal combustion engine by a driving force of the generator motor when a driving force command of the vehicle is larger than a predetermined determination threshold value. The control device includes a switching unit that selects an appropriate traveling range from a plurality of traveling ranges including at least a normal traveling range and a charging priority range for preferentially charging the capacitor and switches the range, and a threshold value increasing unit that increases, when the charging priority range is selected by the switching unit, the predetermined determination threshold value as compared to when the normal traveling range is selected by the switching unit.

(2) The control apparatus for a hybrid vehicle according to the above (1) may further include a generated power increasing unit that increases, when the charging priority range is selected by the switching unit, the amount of power generated by the generator motor as compared to when the normal traveling range is selected by the switching unit.

(3) A control apparatus for a hybrid vehicle according to another embodiment of the invention includes an internal combustion engine and a generator motor that are used as power sources of a vehicle, a capacitor that supplies and receives electrical energy to and from the generator motor, and a driving force assisting unit that assists a driving force of the internal combustion engine by a driving force of the generator motor when a driving force command of the vehicle is larger than a predetermined determination threshold value. The control device includes a gradient acquisition unit that acquires an ascending gradient of a traveling road for the vehicle, and a threshold value increasing unit that increases the predetermined determination threshold value when the ascending gradient acquired by the gradient acquisition unit is larger than the predetermined gradient.

(4) The control apparatus for a hybrid vehicle according to the above (3) may further include a generated power changing unit. The generated power changing unit sets the amount of power generated by the generator motor so that the amount of generated power is increased with the increase of the ascending gradient, when the ascending gradient acquired by the gradient acquisition unit is a predetermined threshold gradient or less; and sets the amount of generated power so that the amount of generated power is decreased with the increase of the ascending gradient, when the ascending gradient is larger than a predetermined threshold gradient.

(5) The control apparatus for a hybrid vehicle according to the above (1) may further include a generated power increasing unit that increases the amount of power generated by the generator motor when the traveling state of the vehicle is a constant speed traveling state and the charging priority range is selected by the switching unit.

(6) The control apparatus for a hybrid vehicle according to the above (3) may further include a generated power changing unit. The generated power changing unit sets the amount of power generated by the generator motor so that the amount of generated power is increased with the increase of the ascending gradient, when the traveling state of the vehicle is a constant speed traveling state and the ascending gradient acquired by the gradient acquisition unit is a predetermined threshold gradient or less; and sets the amount of generated power so that the amount of generated power is decreased with the increase of the ascending gradient, when the traveling state of the vehicle is a constant speed traveling state and the ascending gradient is larger than a predetermined threshold gradient.

(7) The control apparatus for a hybrid vehicle according to the above (1) may further include a generated power increasing unit. The generated power increasing unit prohibits the stop of an idle operation of the internal combustion engine during the stop of the vehicle when the charging priority range is selected by the switching unit, and increases the amount of power generated by the generator motor during the stop of the vehicle as compared to when the normal traveling range is selected by the switching unit.

(8) The control apparatus for a hybrid vehicle according to the above (3) may further include a generated power increasing unit. The generated power increasing unit prohibits the stop of an idle operation of the internal combustion engine during the stop of the vehicle when the ascending gradient acquired by the gradient acquisition unit is larger than a predetermined gradient, and increases the amount of power generated by the generator motor while the idle operation of the internal combustion engine is performed during the stop of the vehicle as compared to when the ascending gradient is a predetermined gradient or less.

(9) A control apparatus for a hybrid vehicle according to another embodiment of the invention includes an internal combustion engine and a generator motor that are used as power sources of a vehicle, a capacitor that supplies and receives electrical energy to and from the generator motor, and a driving force assisting unit that assists a driving force of the internal combustion engine by a driving force of the generator motor when a driving force command of the vehicle is larger than a predetermined determination threshold value. The control device includes a switching unit that selects an appropriate traveling range from a plurality of traveling ranges including at least a normal traveling range and a charging priority range for preferentially charging the capacitor and switches the range, and a generated power increasing unit that increases the amount of power generated by the generator motor while the idle operation of the internal combustion engine is performed during the stop of the vehicle when the charging priority range is selected by the switching unit as compared to when the normal traveling range is selected by the switching unit.

(10) The control apparatus for a hybrid vehicle according to the above (9) may further include a residual capacity acquisition unit that acquires the residual capacity of the capacitor, and an idle speed setting unit. The idle speed setting unit sets an idle speed, while the idle operation of the internal combustion engine is performed during the stop of the vehicle, according to the residual capacity acquired by the residual capacity acquisition unit, when the charging priority range is selected by the switching unit. When the residual capacity is a predetermined residual capacity or less, the idle speed setting unit may increase the idle speed as compared to when the residual capacity is larger than a predetermined residual capacity.

(11) The control apparatus for a hybrid vehicle according to the above (9) may further include a residual capacity acquisition unit that acquires the residual capacity of the capacitor, and an idle speed setting unit. The idle speed setting unit sets an idle speed, while the idle operation of the internal combustion engine is performed during the stop of the vehicle, according to the residual capacity acquired by the residual capacity acquisition unit, when the charging priority range is selected by the switching unit. The idle speed setting unit may set the idle speed so that the idle speed is increased with the decrease of the residual capacity.

(12) The control apparatus for a hybrid vehicle according to the above (9) may further include a residual capacity acquisition unit, a determination unit, and a threshold residual capacity increasing unit. The residual capacity acquisition unit acquires the residual capacity of the capacitor. The determination unit determines whether a power generating operation is performed by the generator motor during the idle operation, according to the determination result of whether the residual capacity acquired by the residual capacity acquisition unit, while the idle operation of the internal combustion engine is performed during the during the stop of the vehicle, is a predetermined threshold residual capacity or less. The threshold residual capacity increasing unit increases the predetermined threshold residual capacity when the charging priority range is selected by the switching unit as compared to when the normal traveling range is selected by the switching unit.

(13) The control apparatus for a hybrid vehicle according to the above (9) may further include an idle stop prohibiting unit. The idle stop prohibiting unit prohibits the stop of the idle operation of the internal combustion engine during the stop of the vehicle when the charging priority range is selected by the switching unit.

(14) A control apparatus for a hybrid vehicle according to another embodiment of the invention includes an internal combustion engine and a generator motor that are used as power sources of a vehicle, a capacitor that supplies and receives electrical energy to and from the generator motor, and a driving force assisting unit that assists a driving force of the internal combustion engine by a driving force of the generator motor when a driving force command of the vehicle is larger than a predetermined determination threshold value. The control device includes a gradient acquisition unit, a traveling road determining unit, and a generated power increasing unit. The gradient acquisition unit acquires an ascending gradient of a traveling road for the vehicle. The traveling road determining unit determines whether the traveling road is an ascending road or a flat road, according to the ascending gradient acquired by the gradient acquisition unit. The generated power increasing unit increases the amount of power generated by the generator motor while the idle operation of the internal combustion engine is performed during the stop of the vehicle when the vehicle is stopped on the ascending road as compared to when the vehicle is stopped on the flat road.

(15) A control apparatus for a hybrid vehicle according to another embodiment of the invention includes an internal combustion engine and a generator motor that are used as power sources of a vehicle, a capacitor that supplies and receives electrical energy to and from the generator motor, and a driving force assisting unit that assists a driving force of the internal combustion engine by a driving force of the generator motor when a driving force command of the vehicle is larger than a predetermined determination threshold value. The control device includes a gradient acquisition unit, a traveling road determining unit, and a generated power increasing unit. The gradient acquisition unit acquires an ascending gradient of a traveling road for the vehicle. The traveling road determining unit determines whether the traveling road is an ascending road or a flat road, according to the ascending gradient acquired by the gradient acquisition unit. The generated power increasing unit increases idle speed and increases the amount of power generated by the generator motor while the idle operation of the internal combustion engine is performed during the stop of the vehicle when the vehicle is stopped on the ascending road as compared to when the vehicle is stopped on the flat road.

(16) The control apparatus for a hybrid vehicle according to the above (1) may further include a gradient acquisition unit, a traveling road determining unit, and a generated power increasing unit. The gradient acquisition unit acquires an ascending gradient of a traveling road for the vehicle. The traveling road determining unit determines whether the traveling road is an ascending road or a flat road, according to the ascending gradient acquired by the gradient acquisition unit.

The generated power increasing unit increases the amount of power generated by the generator motor while the idle operation of the internal combustion engine is performed during the stop of the vehicle when the vehicle is stopped on the ascending road as compared to when the vehicle is stopped on the flat road.

(17) The control apparatus for a hybrid vehicle according to the above (1) may further include a gradient acquisition unit, a traveling road determining unit, and a generated power increasing unit. The gradient acquisition unit acquires an ascending gradient of a traveling road for the vehicle. The traveling road determining unit determines whether the traveling road is an ascending road or a flat road, according to the ascending gradient acquired by the gradient acquisition unit. The generated power increasing unit increases idle speed and increases the amount of power generated by the generator motor while the idle operation of the internal combustion engine is performed during the stop of the vehicle when the vehicle is stopped on the ascending road as compared to when the vehicle is stopped on the flat road.

Effects of the Invention

According to the control apparatus for a hybrid vehicle of the above (1), when the charging priority range is selected, a predetermined determination threshold value corresponding to the driving force command of the vehicle, which is used to determine whether the driving force of the internal combustion engine is assisted by the driving force of the generator motor, is increased as compared to when the normal traveling range is selected. Accordingly, it is possible to suppress the drive of the generator motor in the charging priority range, to suppress the power consumption required for driving the generator motor, and to prevent the residual capacity of the capacitor from being excessively decreased. Further, for example, even if a vehicle travels on an ascending road for a long time, or even if the ascending gradient of an ascending road corresponds to a relatively high gradient, it is possible to ensure a desired driving force of the generator motor.

Furthermore, if the structure of the above (2) is employed, the amount of power generated by the generator motor is increased when the charging priority range is selected as compared to when the normal traveling range is selected. Therefore, it is possible to increase the residual capacity of the capacitor, and to easily ensure a desired driving force of the generator motor.

In addition, according to the control apparatus for a hybrid vehicle of the above (3), when the ascending gradient becomes larger than a predetermined gradient, a predetermined determination threshold value corresponding to the driving force command of the vehicle, which is used to determine whether the driving force of the internal combustion engine is assisted by the driving force of the generator motor, is increased. Accordingly, it is possible to suppress the drive of the generator motor on the ascending road, to suppress the power consumption required for driving the generator motor, and to prevent the residual capacity of the capacitor from being excessively decreased. Further, for example, even if a vehicle travels on the ascending road for a long time, or even if the ascending gradient of the ascending road corresponds to a relatively high gradient, it is possible to ensure a desired driving force of the generator motor.

Furthermore, if the structure of (4) is employed, the amount of generated power is set to be increased with the increase of the ascending gradient when the ascending gradient is a predetermined threshold gradient or less, and the amount of generated power is set to be decreased with the increase of the ascending gradient when the ascending gradient is larger than a predetermined threshold gradient. Therefore, it is possible to ensure desired ascending performance while increasing the residual capacity of the capacitor.

In addition, if the structure of (5) is employed, the amount of generated power is increased in the constant speed traveling state where the charging priority range is selected. Therefore, a driving force of the vehicle is ensured by the internal combustion engine and the drive of the generator motor is suppressed, so that it is possible to increase the residual capacity of the capacitor while ensuring desired vehicle traveling performance.

Further, if the structure of (6) is employed, the amount of generated power is set to be increased with the increase of the ascending gradient when the ascending gradient is a predetermined threshold gradient or less in the constant speed traveling state, and the amount of generated power is set to be decreased with the increase of the ascending gradient when the ascending gradient is larger than a predetermined threshold gradient. Therefore, it is possible to ensure desired ascending performance while increasing the residual capacity of the capacitor.

Furthermore, if the structure of (7) is employed, when the charging priority range is selected and the vehicle is stopped, the stop of an idle operation is prohibited and the amount of generated power is increased. Therefore, it is possible to increase the residual capacity of the capacitor by the power generation that is performed using the driving force of the internal combustion engine.

In addition, if the structure of (8) is employed, when the ascending gradient becomes larger than a predetermined gradient during the stop of the vehicle, the stop of an idle operation is prohibited and the amount of generated power is increased. Therefore, it is possible to increase the residual capacity of the capacitor by the power generation that is performed using the driving force of the internal combustion engine. Further, it is possible to ensure a desired driving force of the generator motor that is required for assisting the driving force of the internal combustion engine on the ascending road.

Furthermore, according to the control apparatus for a hybrid vehicle of the above (9), when the charging priority range is selected, the amount of generated power is increased while the idle operation is performed during the stop of the vehicle as compared to when the normal traveling range is selected. Therefore, it is possible to increase the residual capacity of the capacitor by the power generation that is performed using the driving force of the internal combustion engine.

In addition, if the structure of (10) is employed, when the residual capacity of the capacitor is a predetermined residual capacity or less while the charging priority range is selected and the vehicle is stopped, idle speed is increased. Therefore, it is possible to increase desired residual capacity by the power generation that is performed using the driving force of the internal combustion engine.

Further, if the structure of (11) is employed, when the charging priority range is selected and the vehicle is stopped, the idle speed is changed to be increased with the decrease of the residual capacity of the capacitor. Therefore, it is possible to increase desired residual capacity by the power generation that is performed using the driving force of the internal combustion engine.

Furthermore, if the structure of (12) is employed, when the charging priority range is selected, a predetermined threshold residual capacity (that is, an upper limit threshold value for allowing the power generating operation to be performed)

corresponding to the residual capacity, which is used to determine whether the power generating operation is performed by the generator motor while the idle operation of the internal combustion engine is performed during the stop of the vehicle, is increased as compared to when the normal traveling range is selected. Accordingly, it is possible to increase a region, which allows the power generating operation to be performed, of the residual capacity of the capacitor, and to easily increase the residual capacity.

In addition, if the structure of (13) is employed, when the charging priority range is selected and the vehicle is stopped, the stop of the idle operation is prohibited. Accordingly, it is possible to increase the residual capacity of the capacitor by the power generation that is performed using the driving force of the internal combustion engine. Therefore, it is possible to ensure desired driving force of the generator motor.

Further, according to the control apparatus for a hybrid vehicle of the above (14), since the amount of generated power is increased on the ascending road during the stop of the vehicle, it is possible to increase the residual capacity of the capacitor by the power generation that is performed using the driving force of the internal combustion engine. Accordingly, it is possible to ensure a desired driving force of the generator motor that is required for assisting the driving force of the internal combustion engine on the ascending road.

Furthermore, according to the control apparatus for a hybrid vehicle of the above (15), since the amount of generated power is increased and the idle speed is increased on the ascending road during the stop of the vehicle, it is possible to increase the residual capacity of the capacitor by the power generation that is performed using the driving force of the internal combustion engine. Accordingly, it is possible to ensure a desired driving force of the generator motor that is required for assisting the driving force of the internal combustion engine on the ascending road.

In addition, if the structure of (16) is employed, when the vehicle travels in the charging priority range, the drive of the generator motor is suppressed, the power consumption required for driving the generator motor can be suppressed, and the amount of generated power is increased on the ascending road during the stop of the vehicle. Accordingly, it is possible to increase the residual capacity of the capacitor by the power generation that is performed using the driving force of the internal combustion engine. Therefore, it is possible to ensure a desired driving force of the generator motor that is required for assisting the driving force of the internal combustion engine on the ascending road.

Further, if the structure of (17) is employed, when the vehicle travels in the charging priority range, the drive of the generator motor is suppressed, the power consumption required for driving the generator motor can be suppressed, and the idle speed is increased while the amount of generated power is increased on the ascending road during the stop of the vehicle. Accordingly, it is possible to increase the residual capacity of the capacitor by the power generation that is performed using the driving force of the internal combustion engine. Therefore, it is possible to ensure a desired driving force of the generator motor that is required for assisting the driving force of the internal combustion engine on the ascending road.

BRIEF DESCRIPTION OF THE DRAWINGS

FIG. 10 is a flowchart illustrating a process for controlling an assist operation of a motor in an acceleration state and a low acceleration state according to the embodiment.

DESCRIPTION OF REFERENCE NUMERALS AND SIGNS

11: internal combustion engine.
12: motor (generator motor).
15: high voltage battery (capacitor).
16: control device (driving force assisting unit, switching unit, threshold value increasing unit, generated power increasing unit, generated power changing unit, residual capacity acquisition unit, idle speed setting unit, determination unit, threshold residual capacity increasing unit, idle stop prohibiting unit, and traveling road determining unit).
24: gradient sensor (gradient acquisition unit).

BEST MODE FOR CARRYING OUT THE INVENTION

A control apparatus for a hybrid vehicle according to an embodiment of the invention will be described below with reference to accompanying drawings.

Figure 1:
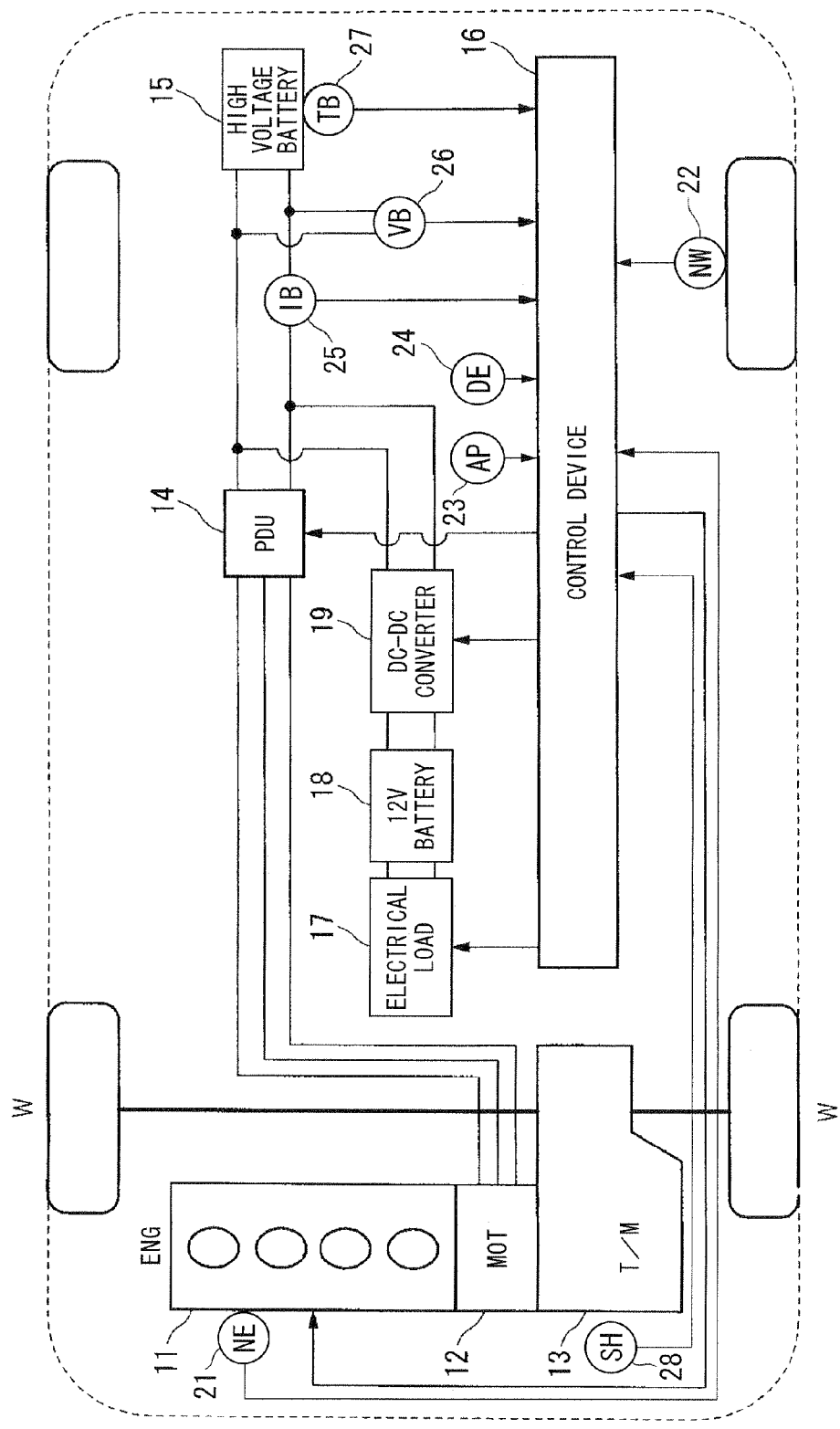
FIG. 1 is a view showing the structure of a hybrid vehicle according to an embodiment of the invention.

A hybrid vehicle 1 according to this embodiment is a parallel hybrid vehicle where an internal combustion engine (ENG) 11, a motor (MOT) 12, and a transmission (T/M) 13 are directly connected to each other in series as shown in FIG. 1. Driving forces of the internal combustion engine 11 and the motor 12 are distributed and transmitted to left and right driving wheels W and W through the transmission 13 and a differential (not shown). When a driving force is transmitted from the driving wheel W to the motor 12 during the deceleration of the hybrid vehicle 1, the motor 12 functions as a generator so as to generate a so-called regenerative braking force, and recovers the kinetic energy of the vehicle body in the form of electrical energy. The motor 12 is driven as a generator by the output of the internal combustion engine 11 according to the operating state of the hybrid vehicle 1, and thus generates power generating energy.

The motor 12 is composed of, for example, a 3-phase (U-phase, V-phase, and W-phase) DC brushless motor, and is connected to a power drive unit (PDU) 14 that controls the drive and generation of the motor 12.

The power drive unit 14 includes a PWM inverter, which performs pulse-width modulation (PWM) and includes a bridge circuit. The bridge circuit is formed by the bridge-connection using a plurality of switching elements of transistors.

A high voltage battery 15, which supplies and receives power (for example, the supply power to be supplied to the motor 12 during the assist operation or the drive of the motor 12, or the output power output from the motor 12 when the motor 12 generates electric power by a regenerative operation or step-up drive) to and from the motor 12, is connected to the power drive unit 14.

Further, the power drive unit 14 receives a control command from a control device 16 and controls the drive and generation of the motor 12. For example, the power drive unit converts DC power, which is output from the high voltage battery 15, into three-phase AC power during the drive of the motor 12 on the basis of a torque command output from the control device 16, and then supplies the three-phase AC power to the motor 12. Meanwhile, when the motor 12 generates electric power, the power drive unit converts the three-phase AC power output from the motor 12 into DC power, and charges the high voltage battery 15.

The power converting operation of the power drive unit 14 is controlled according to a pulse that is input from the control device 16 to a gate of each of the transistors of the bridge circuit of the PWM inverter, that is, a pulse that turns on or off each of the transistors by the pulse-width modulation (PWM). A map (data) of a pulse duty ratio, that is, an ON/OFF ratio is previously stored in the control device 16.

A 12V battery 18, which is composed of various kinds of auxiliary machineries and drives an electrical load 17, is connected in parallel to the power drive unit 14 and the high voltage battery 15 through a DC-DC converter 19.

The DC-DC converter 19 of which a power converting operation is controlled by the control device 16 is, for example, a bidirectional DC-DC converter. The DC-DC converter steps down a voltage between terminals of the high voltage battery 15 or a voltage between terminals of the power drive unit 14 during the regenerative operation or step-up drive of the motor 12 to a predetermined voltage level, and charges the 12V battery 18. Further, when the residual capacity (SOC: State Of Charge) of the high voltage battery 15 is decreased, the DC-DC converter can step up the voltage between terminals of the 12V battery 18 and can charge the high voltage battery 15.

The control device 16 controls the state of the vehicle corresponding to the operating states of the internal combustion engine 11 and the motor 12, the power converting operation of each of the power drive unit 14 and the DC-DC converter 19, the operating state of the electrical load 17, and the like.

For this reason, signals output from various sensors that detect the state of a power plant (that is, the internal combustion engine 11 and the motor 12), and a signal that is output from a shift switch 28 indicating the state SH of the transmission 13 corresponding to a driver's input operation are input to the control device 16. For example, the various sensors include a rotational speed sensor 21 that detects the engine speed NE of the internal combustion engine 11, a rotation angle sensor (not shown) that detects the position of a magnetic pole (phase angle) of a rotor of the motor 12, a wheel speed sensor 22 that detects the rotational speed (wheel speed) NW of a driven wheel in order to detect the speed of a vehicle (vehicle speed), an accelerator opening sensor 23 that detects an accelerator opening AP corresponding to the accelerator operation amount operated by a driver, a gradient sensor 24 that detects the gradient of a traveling road (for example, the ascending gradient DE), a current sensor 25 that detects the charging current and the discharge current (battery current IB) of the high voltage battery 15, a voltage sensor 26 that detects the voltage between the terminals of the high voltage battery 15 (battery voltage VB), and a temperature sensor 27 that detects the temperature of the high voltage battery 15 (battery temperature TB).

The gradient sensor 24 detects the gradient of a traveling road on the basis of, for example, the detection result of an acceleration sensor that detects the acceleration of a vehicle in a longitudinal direction of the vehicle when the vehicle is stopped, or on the basis of the result of, for example, the comparison between the detection value of a driving force of the vehicle and a predetermined traveling resistance of the vehicle on a flat road.

The control device 16 detects the residual capacity SOC of the high voltage battery 15 by, for example, a current integration method. In the current integration method, the control device 16 calculates the amount of integrated charging current and the amount of integrated discharge current by integrating the charging current and the discharge current of the high voltage battery 15, which are detected by the current sensor 25, for each predetermined period. Further, the control device calculates the residual capacity SOC by adding or subtracting the amount of integrated charging current and the amount of integrated discharge current to or from the residual capacity obtained in an initial state or immediately before the beginning of charge and discharge. In this case, the control device 16 performs, for example, a predetermined process for correcting the internal resistance changed due to the battery temperature TB, or a predetermined correcting process according to the storage voltage VB of the high voltage battery 15.

The hybrid vehicle 1 according to this embodiment has the above-mentioned structure. Next, the operation of the control device 16 for the hybrid vehicle 1 will be described.

For example, when it is detected that the state SH of the transmission 13 corresponding to the driver's input operation is changed from a D range corresponding to a normal traveling mode to an L range where a relatively large engine brake is obtained due to the signal output from, for example, the shift switch 28, or it is detected that the traveling road has a predetermined ascending gradient due to the signal output from, for example, the gradient sensor 24, the control device 16 switches the operating states of the internal combustion engine 11 and the motor 12 from a predetermined normal state to a charging priority state where the charging of the high voltage battery 15 relatively has priority.

For example, like a charging priority state shown in Table 1, the control device 16 sets predetermined control states when the operating states of the internal combustion engine 11 and the motor 12 are controlled, according to a predetermined vehicle state that includes a traveling state and a stop state of the vehicle and a predetermined residual capacity SOC of the high voltage battery 15. Further, the predetermined control contents according to the ascending gradient DE of the traveling road are set in each of the control states.

Figure 2:
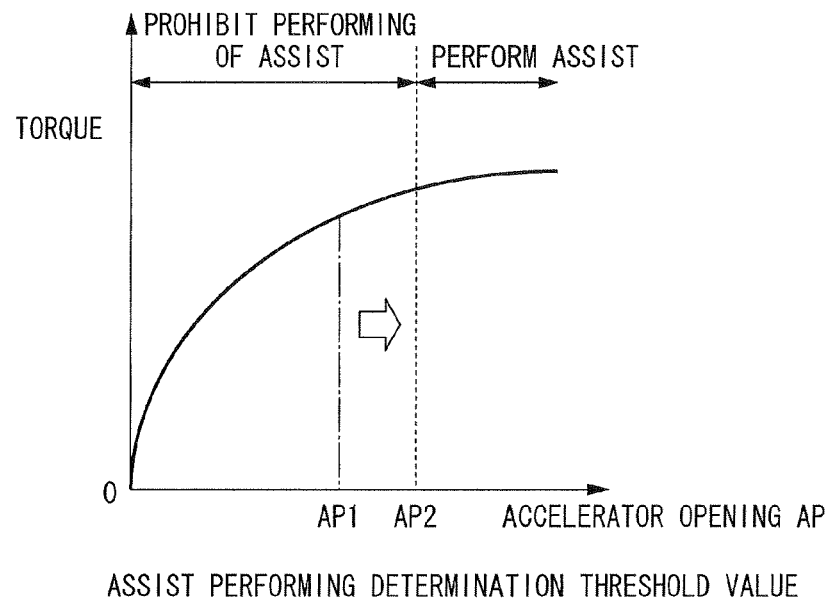
FIG. 2 is a graph showing an example of the change of an assist performing determination threshold value in a predetermined normal state and a predetermined charging priority state according to the embodiment.

For example, if the assist performing determination threshold value is switched from a threshold value AP1 in the predetermined normal state to a threshold value AP2 (>AP1) in the charging priority state as shown in FIG. 2, a region

TABLE 1

| Vehicle state | SOC | Control state | Low ascending (accelerator opening: small) | medium ascending (accelerator opening: medium) | high ascending (accelerator opening: large to maximum) |
|---|---|---|---|---|---|
| Acceleration | High | Assist | Assist amount decrease or zero | Assist amount decrease or zero | Assist amount increase (the same as normal state) |
| Acceleration | Medium | Assist | Assist amount decrease or zero | Assist amount decrease or zero | Assist amount increase (the same as normal state) |
| Acceleration | Low | Acceleration charging | Generated power increase | Generated power increase | Generated power decrease or zero |
| Low acceleration | High | Assist | Assist amount decrease or zero | Assist amount decrease or zero | Assist amount increase (the same as normal state) |
| Low acceleration | Medium | Assist | Assist amount decrease or zero | Assist amount decrease or zero | Assist amount increase (the same as normal state) |
| Low acceleration | Low | Acceleration charging | Generated power increase | Generated power increase | Generated power decrease or zero |
| Cruise | High | Cruise charging | Generated power decrease or zero (the same as normal state) | Generated power decrease or zero (the same as normal state) | Generated power decrease or zero (the same as normal state) |
| Cruise | Medium | Cruise charging | Generated power increase | Generated power increase | Generated power decrease or zero |
| Cruise | Low | Cruise charging | Generated power increase | Generated power increase | Generated power decrease or zero |
| Stop | High | Idle stop | Performing (the same as normal state) | Performing prohibition (the same as normal state) | Performing prohibition (the same as normal state) |
| Stop | Medium | Idle stop | Performing (the same as normal state) | Performing prohibition (the same as normal state) | Performing prohibition (the same as normal state) |
| Stop | Low | Idle charging NE increase | Generated power increase | Generated power increase | Generated power increase |
| Deceleration | — | Regeneration | Predetermined regenerative amount (the same as normal state) | Predetermined regenerative amount (the same as normal state) | Predetermined regenerative amount (the same as normal state) |

For example, in Table 1, a predetermined vehicle state includes an acceleration state that is caused by a relatively high acceleration, a low acceleration state that is caused by a relatively low acceleration, a cruise state that is caused by substantially constant speed traveling, a stop state, and a deceleration state.

The predetermined residual capacity SOC is composed of a high state having a relatively high residual capacity SOC, a low state having a relatively low residual capacity SOC, and a medium state having a residual capacity SOC between the capacities of the high and low states.

The predetermined control states are composed of an assist state that assists the driving force of the internal combustion engine 11 by the driving force of the motor 12, an acceleration charging state that operates the motor 12 as a generator in the acceleration state or the low acceleration state by the driving force of the internal combustion engine 11, a cruise charging state that operates the motor 12 as a generator in the cruise state by the driving force of the internal combustion engine 11, an idle charging state that operates the motor 12 as a generator in an idle operating state during the stop of the vehicle by the driving force of the internal combustion engine 11, and a regenerative state that performs the regenerative operation of the motor 12 in the deceleration state.

First, if the charging priority state is selected as the operating states of the internal combustion engine 11 and the motor 12, the control device 16 changes a predetermined determination threshold value corresponding to a driving force command (for example, the accelerator opening AP) to the vehicle, that is, an assist performing determination threshold value used to determine whether an assist operation for assisting the driving force of the internal combustion engine 11 by the driving force of the motor 12 needs to be performed, into a value higher as compared to the predetermined normal state.

where the performing of the assist operation is prohibited is increased with respect to an accelerator opening AP and the torque of the vehicle, the relatively accelerator opening AP is relatively small or moderate, for example, like in the high state and the medium state of the residual capacity SOC in the acceleration state and the low acceleration state shown Table 1. In a low ascending or medium ascending state where the ascending gradient DE of the traveling road is relatively small or moderate, the assist amount is set to zero so that the performing of the assist operation is prohibited.

In addition, if the charging priority state is selected, the control device 16 increases the amount of generated power of the power generating operation of the motor 12, which is performed by the driving force of the internal combustion engine 11, as compared to the predetermined normal state.

Figure 3:
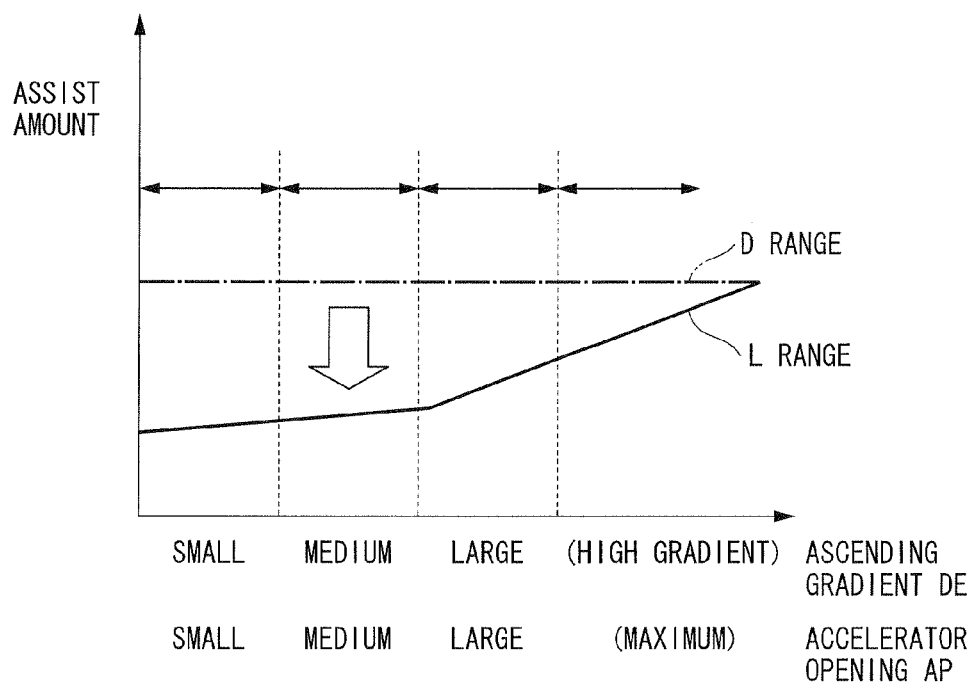
FIG. 3 is a graph showing an example of a correspondence relationship between an assist amount and an ascending gradient DE or an accelerator opening AP in an acceleration state according to the embodiment.

Further, even when the assist operation is allowed to be performed in the charging priority state, the control device 16 decreases the assist amount to a value (for example, the L range shown in FIG. 3) lower as compared to the predetermined normal state (for example, the D range shown in FIG. 3), for example, as shown in the high state and the medium state of the residual capacity SOC in the acceleration state and the low acceleration state of FIG. 3 and Table 1. Further, when the control device reaches a predetermined high ascending state where the ascending gradient DE of the traveling road is relatively large (for example, in a state where the accelerator opening AP is maximum), that is, in a state where the accelerator opening AP is relatively large, the assist amount is set to a value equal to the assist amount in the predetermined normal state.

Meanwhile, for example, according to a correspondence relationship between the assist amount and the ascending gradient DE or the accelerator opening AP shown in FIG. 3, a relatively large assist amount is set in the predetermined normal state regardless of the change of the ascending gradient DE or the accelerator opening AP, and the assist amount is set to be increased toward the assist amount in the predetermined normal state with the increase of the ascending gradient DE or the accelerator opening AP in the charging priority state.

Figure 4:
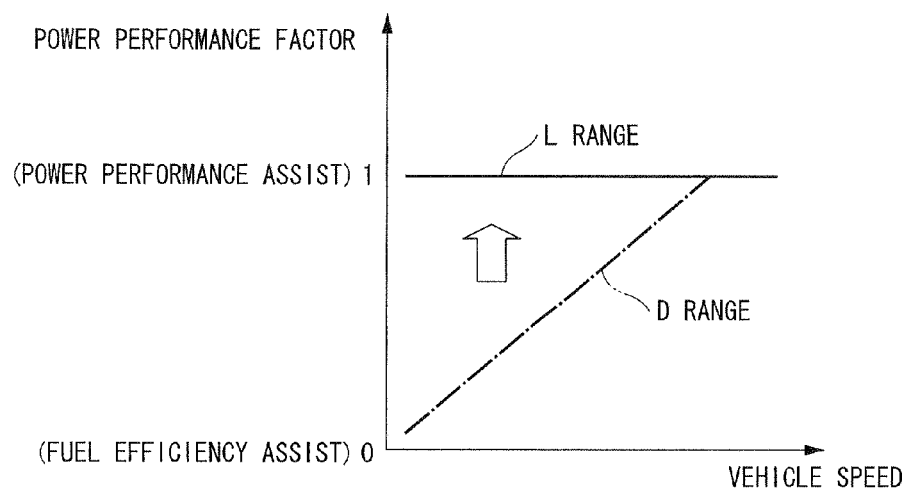
FIG. 4 is a graph showing an example of the change of a power performance factor in a predetermined normal state and a predetermined charging priority state according to the embodiment.

When the assist operation is allowed to be performed in the charging priority state, for example, the control device 16 suppresses the performing of the assist operation that is performed by the motor 12 in order to decrease fuel consumption of the internal combustion engine 11 as shown in FIG. 4, facilitates to the performing of the assist operation that is performed by the motor 12 in order to ensure desired power performance (for example, ascending performance or the like), and changes the power performance factor representing the contents of the assist operation of the motor 12 from zero of the fuel efficiency assist to 1 of the power performance assist.

Meanwhile, for example, according to a correspondence relationship between a power performance factor and the speed of a vehicle (vehicle speed) shown in FIG. 4, the power performance factor is changed and increased from zero of the fuel efficiency assist to 1 of the power performance assist in the predetermined normal state (for example, the D range shown in FIG. 4) with the increase of the vehicle speed, and the power performance factor is set to 1 of the power performance assist in the charging priority state (for example, the L range of FIG. 4) regardless of the change of the vehicle speed.

Accordingly, while a desired driving force is ensured by preferentially using the driving force of the internal combustion engine 11 on an ascending road, it is possible to prevent the assist operation from being excessively performed by the motor 12 and to effectively use the driving force of the motor 12.

For example, like in the low state of the residual capacity SOC in the acceleration state and the low acceleration state shown in Table 1, in the low ascending or medium ascending state where the relatively accelerator opening AP is relatively small or moderate in the charging priority state and the ascending gradient DE of the traveling road is relatively small or moderate, the control device 16 changes the assist state and sets the acceleration charging state that operates the motor 12 as a generator by the driving force of the internal combustion engine 11, and changes the amount of power generated by the motor 12 to a value higher as compared to the predetermined normal state. Meanwhile, in this case, as the amount of power generated by the motor 12 is increased, the load of the internal combustion engine 11 is increased.

Even when the acceleration charging state is set in the charging priority state, the control device 16 decreases the amount of power generated by the motor 12 or sets the amount of power generated by the motor to zero as compared to the low ascending or medium ascending state in the state where the accelerator opening AP is relatively large and the high ascending state where the ascending gradient DE of the traveling road is relatively large.

That is, when the ascending gradient DE is a predetermined threshold gradient or less (for example, in the low ascending or medium ascending state), the control device 16 sets the amount of power generated by the motor 12 so that the amount of generated power is increased with the increase of the ascending gradient DE. When the ascending gradient DE is larger than a predetermined threshold gradient (for example, in the high ascending state), the amount of generated power is set to be decreased with the increase of the ascending gradient DE.

Accordingly, even in the acceleration state and the low acceleration state, it is possible to increase the residual capacity SOC by the power generation of the motor 12 and to ensure a desired driving force by the motor 12 while ensuring an appropriate driving force corresponding to the accelerator opening AP or the ascending gradient DE of the traveling road.

Figure 5:
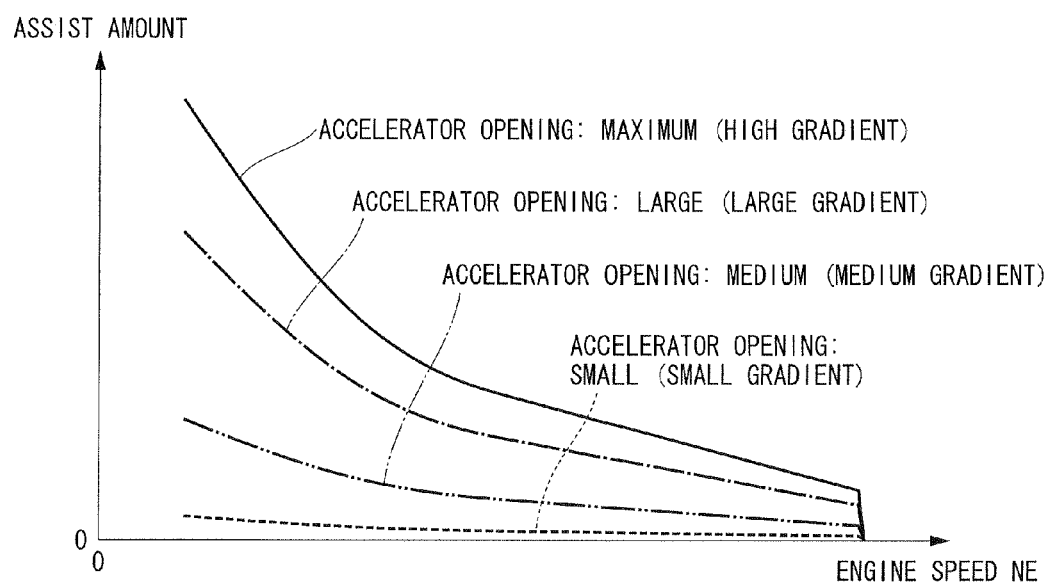
FIG. 5 is a graph showing an example of a correspondence relationship between an assist amount and an ascending gradient DE or an accelerator opening AP that are set for each of a plurality of predetermined ascending gradients DE and predetermined accelerator openings AP in a cruise state according to the embodiment.

Meanwhile, when the assist operation of the acceleration state and the low acceleration state is allowed to be performed in the charging priority state, for example, the control device 16 sets the assist amount with reference to the map of the assist amount that is changed according to the engine speed NE previously set for each of a plurality of predetermined ascending gradients DE and predetermined accelerator openings AP as shown in FIG. 5.

For example, according to a correspondence relationship between the engine speed NE and the assist amount shown in FIG. 5, the assist amount is set to be decreased with the increase of the engine speed NE. Further, the assist amount is set to be increased with respect to an appropriate engine speed NE with the increase of the ascending gradient DE and the accelerator opening AP.

The control device 16 sets a cruise charging state, which operates the motor 12 as a generator by the driving force of the internal combustion engine 11, in the cruise state that is caused by substantially constant speed traveling. Further, when a charging priority state is set as the operating states of the internal combustion engine 11 and the motor 12 in the cruise charging state, the control device increases the amount of generated power to a value (for example, in the L range shown in FIG. 6) higher as compared to the predetermined normal state (for example, in the D range shown in FIG. 6), for example, as shown in the low state and the medium state of the residual capacity SOC in the cruise state of FIG. 6 and Table 1. Furthermore, when the control device reaches a predetermined high ascending state where the ascending gradient DE of the traveling road is relatively large (for example, in a state where the accelerator opening AP is maximum), that is, in a state where the accelerator opening AP is relatively large from a state where the ascending gradient DE of the traveling road is relatively small, that is, in a state where the accelerator opening AP is relatively small, the amount of generated power is set to a value equal to the amount of generated power (for example, zero) in the predetermined normal state.

Figure 6:
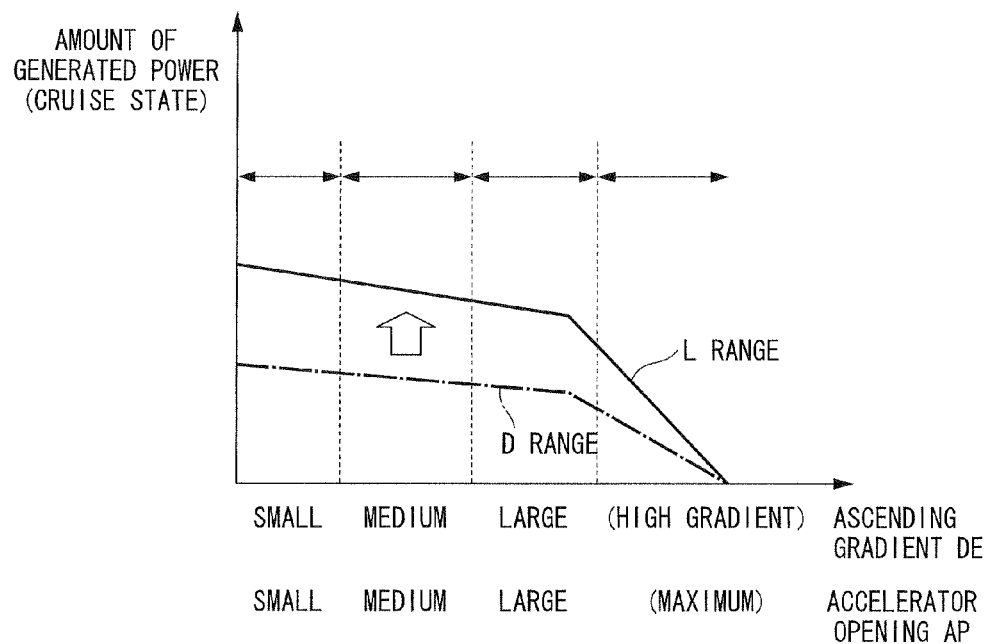
FIG. 6 is a graph showing an example of a correspondence relationship between the amount of generated power and an ascending gradient DE or an accelerator opening AP in a cruise state according to the embodiment.

Meanwhile, for example, according to a correspondence relationship between the amount of generated power and the ascending gradient DE or the accelerator opening AP shown in FIG. 6, the amount of generated power is set to be decreased toward zero with the increase of the ascending gradient DE or the accelerator opening AP.

Accordingly, in the medium state and the low state where the residual capacity SOC is relatively not large, it is possible to increase the residual capacity SOC by the power generation of the motor 12 and to ensure a desired driving force of the motor 12 while ensuring a desired driving force by the internal combustion engine 11 in the cruise state.

Meanwhile, even when the cruise charging state is set in the cruise state, for example, like the cruise state shown in Table 1, the control device 16 makes the amount of generated power be equal to that of a predetermined normal state in the high state of the residual capacity SOC, and decreases the amount of generated power or sets the amount of generated power to zero as compared to the low state and the medium state of the residual capacity SOC.

That is, when the ascending gradient DE is a predetermined threshold gradient or less (for example, in the low ascending or medium ascending state) in the cruise state that is caused by substantially constant speed traveling, the control device 16 sets the amount of power generated by the motor 12 so that the generated amount of power is increased with the increase of the ascending gradient DE. When the ascending gradient DE is larger than a predetermined threshold gradient (for example, in the high ascending state), the amount of generated power is set to be decreased with the increase of the ascending gradient DE.

Figure 7:
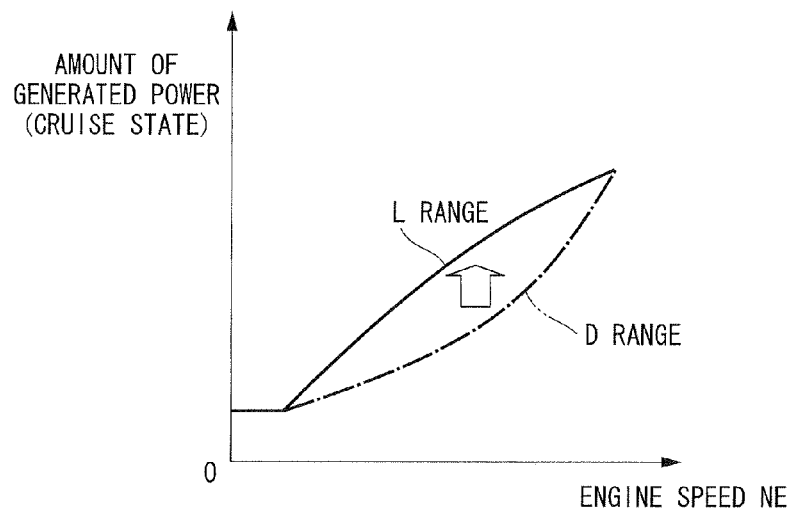
FIG. 7 is a graph showing an example of a correspondence relationship between the amount of generated power and an engine speed NE in a predetermined normal state and a predetermined charging priority state of a cruise state according to the embodiment.

When the cruise charging state of the cruise state is set, for example, as shown in FIG. 7, the control device 16 sets the amount of generated power with reference to the map of the amount of generated power changed according to the engine speed NE.

For example, according to a correspondence relationship between the engine speed NE and the amount of generated power shown in FIG. 7, the amount of generated power is set to be increased with the increase of the engine speed NE.

If the charging priority state is selected as the operating states of the internal combustion engine 11 and the motor 12 during the stop of the vehicle, the control device 16 changes a predetermined determination threshold value of the residual capacity SOC, that is, an idle charging determination threshold value used to determine whether a power generating operation of the motor 12 in the idle operating state of the internal combustion engine 11 during the stop of the vehicle needs to be performed, into a value higher as compared to the predetermined normal state.

Accordingly, in the charging priority state, a region where the power generating operation of the motor 12 in the idle operating state is performed is increased with respect to the residual capacity SOC, and the residual capacity SOC is increased.

In addition, the control device 16 prohibits the stop of the idle operation of the internal combustion engine 11 in the charging priority state, and increases the amount of generated power of the power generating operation of the motor 12 that is performed by the driving force of the internal combustion engine 11 as compared to the predetermined normal state.

In addition, if the residual capacity SOC becomes a predetermined residual capacity or less, the control device 16 increases the engine speed NE (idle speed) in the idle operating state as compared to when the residual capacity SOC is larger than a predetermined residual capacity, or sets an idle speed so that the idle speed is increased with the decrease of the residual capacity SOC.

Figure 8:
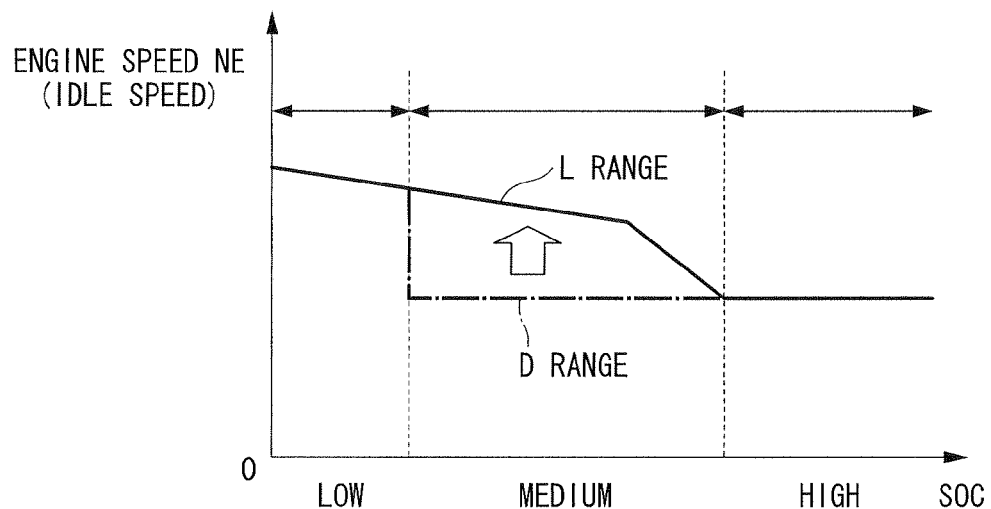
FIG. 8 is a graph showing an example of a correspondence relationship between an idle speed and a residual capacity SOC in a predetermined normal state and a predetermined charging priority state of an idle operating state according to the embodiment.
Figure 9:
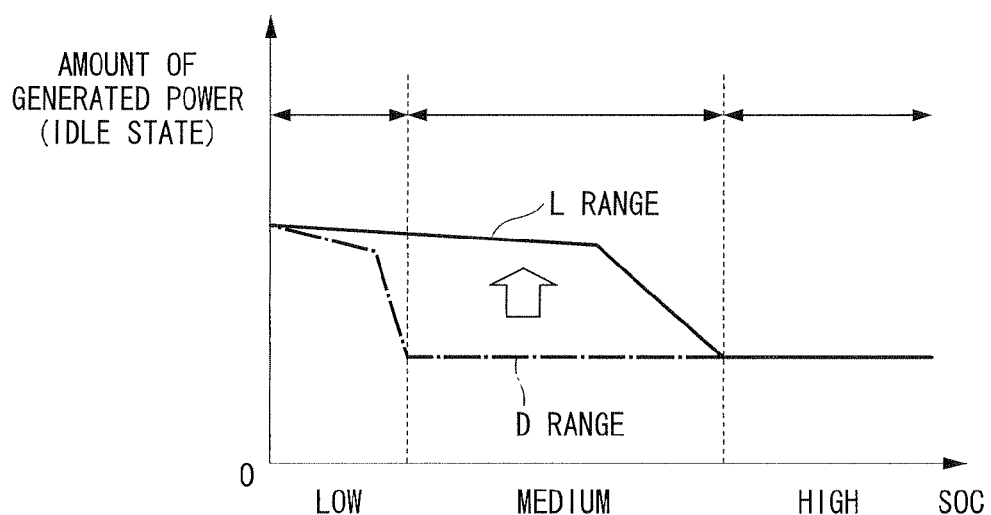
FIG. 9 is a graph showing an example of a correspondence relationship between the amount of generated power and a residual capacity SOC in a predetermined normal state and a predetermined charging priority state of an idle operating state according to the embodiment.

When the idle charging is allowed to be performed in the charging priority state, for example, as shown in FIGS. 8 and 9, the control device 16 increases the amount of power generated by the motor 12 and the engine speed NE (idle speed) of the internal combustion engine 11 of the idle operating state to a value (for example, the L range shown in FIGS. 8 and 9) higher as compared to the predetermined normal state (for example, the D range shown in FIGS. 8 and 9). Further, the control device 16 prohibits the stop of the idle operation of the internal combustion engine 11.

According to a correspondence relationship between the idle speed and the residual capacity SOC shown in FIG. 8, in a predetermined normal state, the idle speed is set not to be changed in the high state and the medium state of the residual capacity SOC, and the idle speed is set to be increased with the decrease of the residual capacity SOC in the low state of the residual capacity SOC. In contrast, in the charging priority state, the idle speed is set not to be changed in the high state of the residual capacity SOC, and the idle speed is set to be increased with the decrease of the residual capacity SOC in the medium state and the low state of the residual capacity SOC.

According to a correspondence relationship between the residual capacity SOC and the amount of generated power in the idle operating state shown in FIG. 9, in a predetermined normal state, the amount of generated power is set not to be changed in the high state and the medium state of the residual capacity SOC, and the amount of generated power is set to be increased with the decrease of the residual capacity SOC in the low state of the residual capacity SOC. In contrast, in the charging priority state, the amount of generated power is set not to be changed in the high state of the residual capacity SOC, and the amount of generated power is set to be increased with the decrease of the residual capacity SOC in the medium state and the low state of the residual capacity SOC.

When the idle charging is allowed to be performed in the charging priority state during the stop of the vehicle, the control device 16 sets the amount of power generated by the motor 12 so that the amount of generated power is increased with the increase of the ascending gradient.

For example, as shown in the low ascending state where the ascending gradient DE of the traveling road is relatively small, that is, a state where the accelerator opening AP in the stop state of Table 1 is relatively small, even in the charging priority state, the control device 16 stops the idle operation in the high state and the medium state of the residual capacity SOC like in the predetermined normal state. In contrast, unlike in the predetermined normal state, in the low state of the residual capacity SOC of the charging priority state, the control device prohibits the stop of the idle operation and increases the amount of generated power of the idle operating state.

Even in the charging priority state of the stop state, for example, as shown in Table 1, in the high state and the medium state of the residual capacity SOC like in the predetermined normal state, the control device 16 stops the idle operation in the low ascending state where the ascending gradient DE of the traveling road is relatively small, that is a state where the accelerator opening AP is relatively small. The control device prohibits the stop of the idle operation in the high state and the medium state, that is, a state the ascending gradient DE of the traveling road is relatively small, that is, a state where the accelerator opening AP is relatively medium or large, and increases the amount of the generated power in the idle operating state.

That is, when the ascending gradient DE is larger than a predetermined threshold gradient, the control device 16 prohibits the stop of the idle operation and increases the amount of power generated by the motor 12 using the driving force of the internal combustion engine 11 during the idle operation as compared to when the ascending gradient DE is a predetermined gradient or less.

A process for controlling the assist operation of the motor 12 in the acceleration state and the low acceleration state will be described below.

First, for example, in Step S01 shown FIG. 10, the engine speed NE detected by the rotational speed sensor 21 is acquired.

In Step S02, the accelerator opening AP detected by the accelerator opening sensor 23 is acquired.

In Step S03, the ascending gradient DE of the traveling road detected by the gradient sensor 24 is acquired.

In Step S04, the residual capacity SOC of the high voltage battery 15 is acquired.

In Step S05, it is determined whether the ascending gradient DE is larger than a predetermined first threshold value.

If this determination result is "NO", the process proceeds to Step S10 to be described below.

Meanwhile, if this determination result is "YES", the process proceeds to Step S06.

Further, in Step S06, it is determined whether the state SH of the transmission 13 is in the L range (charging priority range) on the basis of the output signal of the shift switch 28 that corresponds to the driver's input operation.

If this determination result is "YES", the process proceeds to Step S08 to be described below.

Meanwhile, if this determination result is "NO", the process proceeds to Step S07.

Further, in Step S07, the assist amount is acquired by the map search of an assist MAP that sets the assist amount corresponding to the engine speed NE and the accelerator opening AP in the predetermined normal state, and a series of processes are terminated.

Furthermore, in Step S08, it is determined whether the residual capacity SOC of the high voltage battery 15 is larger than a predetermined calculated capacity.

If this determination result is "YES", the process proceeds to the above-mentioned Step S07.

Meanwhile, if this determination result is "NO", the process proceeds to Step S09.

Further, in Step S09, the assist amount is acquired by the map search of the engine speed NE and the accelerator opening AP on a first assist MAP, which corresponds to the large gradient (or high gradient), for example, shown in FIG. 5, and a series of processes are terminated.

In Step S10, it is determined whether the ascending gradient is larger than a predetermined second threshold value smaller than the first threshold value.

If this determination result is "NO", the process proceeds to Step S14 to be described below.

Meanwhile, if this determination result is "YES", the process proceeds to Step S11.

In Step S11, it is determined whether the state SH of the transmission 13 is in the L range (charging priority range) on the basis of the output signal of the shift switch 28 that corresponds to the driver's input operation.

If this determination result is "NO", the process proceeds to the above-mentioned Step S07.

Meanwhile, if this determination result is "YES", the process proceeds to Step S12.

In Step S12, it is determined whether the residual capacity SOC of high voltage battery 15 is larger than a predetermined calculated capacity.

If this determination result is "YES", the process proceeds to the above-mentioned Step S07.

Meanwhile, if this determination result is "NO", the process proceeds to Step S13.

Further, in Step S13, the assist amount is acquired by the map search of the engine speed NE and the accelerator opening AP on a second assist MAP, which corresponds to the medium gradient, for example, shown in FIG. 5, and a series of processes are terminated.

In Step S14, it is determined whether the state SH of the transmission 13 is in the L range (charging priority range) on the basis of the output signal of the shift switch 28 that corresponds to the driver's input operation.

If this determination result is "NO", the process proceeds to the above-mentioned Step S07.

Meanwhile, if this determination result is "YES", the process proceeds to Step S15.

In Step S15, it is determined whether the residual capacity SOC of the high voltage battery 15 is larger than a predetermined calculated capacity.

If this determination result is "YES", the process proceeds to the above-mentioned Step S07.

Meanwhile, if this determination result is "NO", the process proceeds to Step S16.

In Step S16, the assist amount is acquired by the map search of the engine speed NE and the accelerator opening AP on a third assist MAP, which corresponds to the small gradient, for example, shown in FIG. 5, and a series of processes are terminated.

As described above, according to the control device 16 for the hybrid vehicle 1 of the embodiment, when the charging priority state is selected, the assist performing determination threshold value used to determine whether the driving force of the internal combustion engine 11 is assisted by the driving force of the motor 12 is increased as compared to when the predetermined normal state is selected. Accordingly, it is possible to suppress the drive of the motor 12, to suppress the power consumption required for driving the motor 12, and to prevent the residual capacity SOC of the high voltage battery 15 from being excessively decreased. Further, for example, even if a vehicle travels on an ascending road for a long time, or even if the ascending gradient of an ascending road corresponds to a relatively high gradient, it is possible to ensure a desired driving force of the motor 12 that is used to assist the driving force of the internal combustion engine 11.

Furthermore, when the charging priority state is selected, the amount of generated power of the power generating operation of the motor 12 is increased by the driving force of the internal combustion engine 11 as compared to when the predetermined normal state is selected. Therefore, it is possible to increase the residual capacity SOC of the high voltage battery 15 and to easily ensure a desired driving force of the motor 12 that is used to assist the driving force of the internal combustion engine 11.

In addition, since the amount of power generated by the motor 12 is increased during the stop of the vehicle or the constant speed traveling state of the charging priority state, it is possible to increase the residual capacity SOC of the high voltage battery 15 as compared to the predetermined normal state. Further, since the stop of the idle operation is prohibited during the stop of the vehicle and the idle speed is increased if the residual capacity SOC becomes a predetermined residual capacity or less, it is possible to easily ensure the desired residual capacity by the power generation of the motor 12 that is caused by the driving force of the internal combustion engine 11.

Furthermore, in the charging priority state, the idle charging determination threshold value of the residual capacity SOC used to determine whether a power generating operation of the motor 12 in the idle operating state of the internal combustion engine 11 during the stop of the vehicle needs to be performed (that is, an upper limit threshold value for allowing the power generating operation to be performed) is increased as compared to a predetermined normal state. Accordingly, it is possible to increase a region, which allows the power generating operation to be performed, of the residual capacity SOC of the high voltage battery 15, and to easily increase the residual capacity SOC.

Meanwhile, according to the above-mentioned embodiment, in the charging priority state, the control device 16 has changed the assist performing determination threshold value of the driving force command (for example, the accelerator opening AP) of the vehicle into a value higher as compared to the predetermined normal state. The invention is not limited thereto. For example, when the ascending gradient DE detected by the gradient sensor 24 is larger than a predetermined gradient, the assist performing determination threshold value may be changed into a value higher as compared to when the ascending gradient DE is smaller than a predetermined gradient (for example, in the state of a flat road).

In addition, for example, in a state where a driving force command (for example, the accelerator opening AP) is smaller than the assist performing determination threshold value and the power generating operation of the motor 12 is performed by the driving force of the internal combustion engine 11 when the ascending gradient DE is larger than a predetermined gradient, the control device 16 set the amount of power generated by the motor 12 so that the amount of generated power is increased with the increase of the ascending gradient DE if the ascending gradient DE is a predetermined threshold gradient or less (for example, in the low ascending or medium ascending state), and sets the amount of generated power so that the amount of generated power is decreased with the increase of the ascending gradient DE if the ascending gradient DE is larger than a threshold gradient (for example, in the high ascending state).

Further, as for the stop of the vehicle, when a vehicle is stopped on the ascending road, the control device 16 increases the amount of generated power of the power generating operation of the motor 12 by the driving force of the internal combustion engine 11 of the idle operating state as compared to when the vehicle is stopped on the flat road, thereby increasing the engine speed NE (idle speed) of the internal combustion engine 11.

According to this modification, it is possible to suppress the drive of the motor 12, to suppress the power consumption required for driving the motor 12, and to prevent the residual capacity SOC of the high voltage battery 15 from being excessively decreased. Accordingly, for example, even if a vehicle travels on an ascending road for a long time, or even if the ascending gradient of an ascending road corresponds to a relatively high gradient, it is possible to ensure a desired driving force of the motor 12 that is used to assist the driving force of the internal combustion engine 11. Further, since the amount of generated power is changed according to the ascending gradient DE, it is possible to ensure desired ascending performance while increasing the residual capacity SOC of the high voltage battery 15.

Meanwhile, in the above-mentioned embodiment, the hybrid vehicle 1 has been a parallel hybrid vehicle where the internal combustion engine (ENG) 11, the motor 12, and the transmission 13 has been directly connected to each other in series. However, the invention is not limited thereto, and the hybrid vehicle may be a different type of hybrid vehicle.

INDUSTRIAL APPLICABILITY

According to the invention, it is possible to provide a control apparatus for a hybrid vehicle that can ensure desired ascending performance.

The invention claimed is:

1. A control apparatus for a hybrid vehicle including an internal combustion engine and a generator motor that are used as power sources of a vehicle, a capacitor that supplies and receives electrical energy to and from the generator motor, and a driving force assisting unit that assists a driving force of the internal combustion engine by a driving force of the generator motor when a driving force command of the vehicle is larger than a predetermined determination threshold value, the control apparatus comprising:
   a switching unit that selects an appropriate traveling range according to a state of transmission corresponding to a driver's input operation and a state of the internal combustion engine and of the generator motor from a plurality of traveling ranges including at least a normal traveling range and a charging priority range for preferentially charging the capacitor, and switches the ranges; and
   a threshold value increasing unit that increases, when the charging priority range is selected by the switching unit, the predetermined determination threshold value as compared to when the normal traveling range is selected by the switching unit
   wherein the predetermined determination threshold value comprises an accelerator opening.

2. The control apparatus for a hybrid vehicle according to claim 1, further comprising
   a generated power increasing unit that increases, when the charging priority range is selected by the switching unit, an amount of power generated by the generator motor as compared to when the normal traveling range is selected by the switching unit.

3. The control apparatus for a hybrid vehicle according to claim 1, further comprising
   a generated power increasing unit that increases an amount of power generated by the generator motor when the traveling state of the vehicle is a constant speed traveling state and the charging priority range is selected by the switching unit.

4. The control apparatus for a hybrid vehicle according to claim 1, further comprising
   a generated power increasing unit that
   prohibits a stop of an idle operation of the internal combustion engine during the stop of the vehicle when the charging priority range is selected by the switching unit, and
   increases an amount of power generated by the generator motor during the stop of the vehicle as compared to when the normal traveling range is selected by the switching unit.

5. The control apparatus for a hybrid vehicle according to claim 1, further comprising:
   a gradient acquisition unit that acquires an ascending gradient of a traveling road for the vehicle;
   a traveling road determining unit for determining whether the traveling road is an ascending road or a flat road, according to the ascending gradient acquired by the gradient acquisition unit; and
   a generated power increasing unit that increases an amount of power generated by the generator motor while the idle operation of the internal combustion engine is performed during the stop of the vehicle when the vehicle is stopped on the ascending road as compared to when the vehicle is stopped on the flat road.

6. The control apparatus for a hybrid vehicle according to claim 1, further comprising:
   a gradient acquisition unit that acquires an ascending gradient of a traveling road for the vehicle;
   a traveling road determining unit for determining whether the traveling road is an ascending road or a flat road, according to the ascending gradient acquired by the gradient acquisition unit; and
   a generated power increasing unit that increases idle speed and increases an amount of power generated by the generator motor while the idle operation of the internal combustion engine is performed during the stop of the vehicle when the vehicle is stopped on the ascending road as compared to when the vehicle is stopped on the flat road.

* * * * *